United States Patent
Li et al.

(10) Patent No.: US 10,861,133 B1
(45) Date of Patent: Dec. 8, 2020

(54) SUPER-RESOLUTION VIDEO RECONSTRUCTION METHOD, DEVICE, APPARATUS AND COMPUTER-READABLE STORAGE MEDIUM

(71) Applicant: Beijing Baidu Netcom Science and Technology Co., Ltd., Beijing (CN)

(72) Inventors: Chao Li, Beijing (CN); Dongliang He, Beijing (CN); Xiao Liu, Beijing (CN); Yukang Ding, Beijing (CN); Shilei Wen, Beijing (CN); Errui Ding, Beijing (CN); Henan Zhang, Beijing (CN); Hao Sun, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 16/810,986

(22) Filed: Mar. 6, 2020

(30) Foreign Application Priority Data

May 23, 2019 (CN) .......................... 2019 1 0432445

(51) Int. Cl.
*G06T 3/40* (2006.01)

(52) U.S. Cl.
CPC .......... *G06T 3/4046* (2013.01); *G06T 3/4053* (2013.01)

(58) Field of Classification Search
CPC ............................ G06T 3/4046; G06T 3/4053
USPC ......................................................... 348/575
See application file for complete search history.

(56) References Cited

U.S. PATENT DOCUMENTS

| | | | |
|---|---|---|---|
| 2018/0114071 A1* | 4/2018 | Wang ........................ | G06N 3/04 |
| 2018/0144447 A1* | 5/2018 | Tate .......................... | G06T 5/50 |
| 2019/0325343 A1* | 10/2019 | Feng ................... | G06F 16/9024 |
| 2019/0370938 A1* | 12/2019 | Huang .................. | G06T 3/4053 |

* cited by examiner

*Primary Examiner* — Michael Lee
(74) *Attorney, Agent, or Firm* — Patterson Thuente Pedersen, P.A.

(57) ABSTRACT

A super-resolution video reconstruction method, device, apparatus and a computer-readable storage medium are provided. The method includes: extracting a hypergraph from consecutive frames of an original video; inputting a hypergraph vector of the hypergraph into a residual convolutional neural network to obtain an output result of the residual convolutional neural network; and inputting the output result of the residual convolutional neural network into a spatial upsampling network to obtain a super-resolution frame, wherein a super-resolution video of the original video is formed by multiple super-resolution frames.

13 Claims, 4 Drawing Sheets

SUPER-RESOLUTION VIDEO RECONSTRUCTION METHOD, DEVICE, APPARATUS AND COMPUTER-READABLE STORAGE MEDIUM

CROSS-REFERENCE TO RELATED APPLICATION

This application claims priority to Chinese Patent Application No. 201910432445.X, filed on May 23, 2019, which is hereby incorporated by reference in its entirety.

TECHNICAL FIELD

The present application relates to a field of video processing technology, and in particular, to a super-resolution video reconstruction method, device, apparatus and a computer-readable storage medium.

BACKGROUND

With the rise of mobile Internet, a way for storing and transmitting information used by a user is gradually changed from a text and a picture to a video. However, video transmission requires a higher network bandwidth, and video storage requires a more space of a hard disk. A low-resolution video can be converted to a high-resolution video by using a super-resolution video reconstruction technology. A low-resolution video can be transmitted and stored through a video service, and a high-resolution video is displayed for users by using the super-resolution technology, and provide users with a high-quality video viewing experience while saving the bandwidth and the storage space. In the existing super-resolution technology, the super-resolution image reconstruction method is used to perform a super-resolution video reconstruction frame by frame. The effect of the super-resolution method is poor, and dynamic blur in the video cannot be processed, which can be solved by using technology such as the optical flow and motion compensation and the like, but there are a large amount of computation in the super-resolution method. Further, due to the pre-training of the optical flow, an error in the pre-training can be propagated to the super-resolution task, resulting in degradation of the super-resolution effect.

SUMMARY

A super-resolution video reconstruction method, device, apparatus and a computer-readable storage medium are provided according to embodiments of the present application, so as to at least solve the above technical problems in the existing technology.

In a first aspect, a super-resolution video reconstruction method includes extracting a hypergraph from consecutive frames of an original video, inputting a hypergraph vector of the hypergraph into a residual convolutional neural network to obtain an output result of the residual convolutional neural network, and inputting the output result of the residual convolutional neural network into a spatial upsampling network to obtain a super-resolution frame, wherein a super-resolution video of the original video is formed by multiple super-resolution frame.

In one implementation, the inputting a hypergraph vector of the hypergraph into a residual convolutional neural network to obtain an output result of the residual convolutional neural network includes arranging channels of the frames of the hypergraph in a chronological order to obtain an arranged channel sequence, and using the arranged channel sequence as channel dimension information of the hypergraph vector, wherein the channels of each frame includes a red channel, a green channel, and a blue channel and using a length and a width of the hypergraph as a length dimension information and a width dimension information of the hypergraph vector, respectively.

In one implementation, the residual convolutional neural network includes a multi-layer residual convolution module, and the inputting a hypergraph vector of the hypergraph into a residual convolutional neural network to obtain an output result of the residual convolutional neural network further includes inputting an i−1-th input vector into an i-th layer of the residual residual convolution module to obtain an i-th output vector, splicing channel dimension information of the i-th output vector and channel dimension information of the i−1-th input vector, and obtaining an i-th input vector by combining the spliced channel dimension information with length dimension information and width dimension information of the i-th output vector. In implementations, i is an integer greater than 2; when i is equal to 1, the i−1-th input vector is the hypergraph vector; and when i is equal to a preset value, the i-th input vector is used as the output result of the residual convolutional neural network.

In one implementation, the inputting the output result of the residual convolutional neural network into a spatial upsampling network to obtain a super-resolution frame includes converting a size of the output result to obtain an intermediate conversion result, wherein a size of the intermediate conversion result is equal to length dimension information of the output result*width dimension information of the output result*a number of channel dimensions, and the number of channel dimensions is equal to f*f*3, and f is a preset magnification factor, and performing a channel space conversion operation on the intermediate conversion result to obtain the super-resolution frame of a specified size, wherein the specified size is equal to (the length dimension information of the output result*f)*(the width dimension information of the output result*f).

In one implementation, the extracting a hypergraph from consecutive frames of an original video includes cutting each frame of the consecutive frames in a time axis direction by using a preset rectangular box in a 3D coordinate system, to obtain the hypergraph represented as a cube, wherein the 3D coordinate system includes a length axis, a width axis, and the time axis, and using the cube as the hypergraph.

In one implementation, the using the cube as the hypergraph includes performing a gain operation on the cube to obtain the hypergraph, wherein the gain operation includes at least one of a flip on the length axis, a flip on the width axis, a flip on the time axis, and a rotation on a plane of the length axis and the width axis.

In a second aspect, a super-resolution video reconstruction device, including an extracting module, configured to extract a hypergraph from consecutive frames of an original video a first inputting module, configured to input a hypergraph vector of the hypergraph into a residual convolutional neural network to obtain an output result of the residual convolutional neural network, and a second inputting module, configured to input the output result of the residual convolutional neural network into a spatial upsampling network to obtain a super-resolution frame, wherein a super-resolution video of the original video is formed by multiple super-resolution frames.

In one implementation, the first inputting module includes a channel dimension information determining sub-module, configured to arrange channels of the frames of the hypergraph in a chronological order to obtain an arranged channel sequence, and using the arranged channel sequence as channel dimension information of the hypergraph vector, wherein the channels of each frame includes a red channel, a green channel, and a blue channel, a length dimension information determining sub-module, configured to use a length and a width of the hypergraph as length dimension information and width dimension information of the hypergraph vector, respectively.

In one implementation, the residual convolutional neural network includes a multi-layer residual convolution module, and the first inputting module further includes an inputting sub-module, configured to input an i−1-th input vector into an i-th layer of the residual convolution module to obtain an i-th output vector, an splicing sub-module, configured to splice channel dimension information of the i-th output vector and channel dimension information of the i−1-th input vector, and obtaining an i-th input vector by combining the spliced channel dimension information with length dimension information and width dimension information of the i-th output vector, wherein i is an integer greater than 2; when i is equal to 1, the i−1-th input vector is the hypergraph vector; and when i is equal to a preset value, the i-th input vector is used as the output result of the residual convolutional neural network.

In one implementation, the second inputting module includes a first converting sub-module, configured to convert a size of the output result to obtain an intermediate conversion result, wherein a size of the intermediate conversion result is equal to length dimension information of the output result*width dimension information of the output result*a number of channel dimensions, and the number of channel dimensions is equal to f*f*3, and f is a preset magnification factor, and a second converting sub-module, configured to perform a channel space conversion operation on the intermediate conversion result to obtain the super-resolution frame of a specified size, wherein the specified size is equal to (the length dimension information of the output result*f)*(the width dimension information of the output result*f).

In one implementation, the extracting module includes a cube obtaining sub-module, configured to cut each frame of the consecutive frames in a time axis direction by using a preset rectangular box in a 3D coordinate system, to obtain the hypergraph represented as a cube, wherein the 3D coordinate system includes a length axis, a width axis, and the time axis, and a hypergraph determining sub-module, configured to use the cube as the hypergraph.

In one implementation, the hypergraph determining sub-module includes a gain unit, configured to perform a gain operation on the cube to obtain the hypergraph, wherein the gain operation includes at least one of a flip on the length axis, a flip on the width axis, a flip on the time axis, and a rotation on a plane of the length axis and the width axis.

In a third aspect, a super-resolution video reconstruction apparatus is provided according to an embodiment of the present application. The functions of the apparatus may be implemented by hardware, or by hardware executing corresponding software. The hardware and/or software includes one or more modules corresponding to the above functions.

In a possible embodiment, the super-resolution video reconstruction apparatus includes a processor and a storage, the storage is configured to store a program for supporting the above super-resolution video reconstruction method executed by the super-resolution video reconstruction apparatus, the processor is configured to execute the program stored in the storage. The super-resolution video reconstruction apparatus further includes a communication interface configured for communication between the super-resolution video reconstruction apparatus and another apparatus or communication network.

In a fourth aspect, a computer-readable storage medium is provided for storing computer software instructions used by the super-resolution video reconstruction apparatus, the computer software instructions include programs involved in execution of the above super-resolution video reconstruction method.

In the above technical solution, the time domain information of the original video is preserved by using the hypergraph composed of the consecutive frames, and the time domain information is modeled by using the residual convolutional neural network and the spatial upsampling network. In the case of the same computational complexity with the image super-resolution network, the effect of video super-resolution can be significantly increased.

The above summary is for the purpose of the specification only and is not intended to be limiting in any way. In addition to the illustrative aspects, embodiments, and features described above, further aspects, embodiments, and features of the present application will be readily understood by reference to the drawings and the following detailed description.

BRIEF DESCRIPTION OF THE DRAWINGS

In the drawings, unless otherwise specified, identical reference numerals will be used throughout the drawings to refer to identical or similar parts or elements. The drawings are not necessarily drawn to scale. It should be understood that these drawings depict only some embodiments disclosed according to the present application and are not to be considered as limiting the scope of the present application.

DETAILED DESCRIPTION OF THE EMBODIMENTS

In the following, only certain exemplary embodiments are briefly described. As those skilled in the art would realize, the described embodiments may be modified in various different ways, all without departing from the spirit or scope of the present application. Accordingly, the drawings and description are to be regarded as illustrative in nature and not restrictive.

Figure 1:
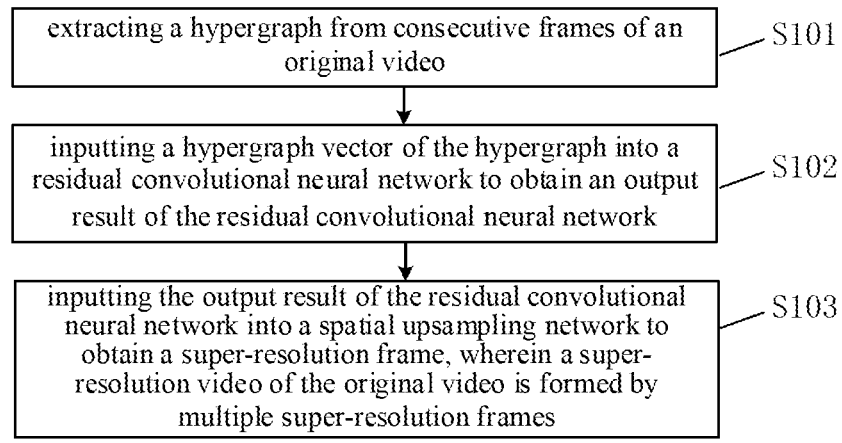
FIG. 1 shows a flowchart of a super-resolution video reconstruction method according to embodiments of the present application.

FIG. 1 shows a flowchart of a super-resolution video reconstruction method according to an embodiment of the present application. As shown in FIG. 1, the method can include S101 to S103.

In S101, a hypergraph is extracted from consecutive frames of an original video.

A video clip can be evenly sampled from the original video, and then consecutive frames with a fixed length are randomly selected from the video clip. The consecutive frames may include a sequence of multi-frames arranged in a chronological order. The hypergraph is extracted from the consecutive frames. The hypergraph is a generalized graph, one side of which can be connected to any number of vertexes. Formally, the hypergraph can be a collection of multiple vertex elements and connected edge elements. In other words, the consecutive frames can also constitute the hypergraph.

In one embodiment, the hypergraph may be extracted from the consecutive frames by using the following methods: in a 3D coordinate system, the consecutive frames are cut in a time axis direction by using a preset rectangular frame to obtain a cube; the 3D coordinate system includes a length axis, a width axis, and a time axis; and the cube is used as the hypergraph. In this way, a rectangular area with a preset size can be intercepted from each frame of the consecutive frames, and the rectangular areas intercepted from the consecutive frames are aligned. Further, the cube having length information, width information, and time domain information can be obtained, and the cube can be used as the hypergraph.

In one embodiment, a gain operation may be further performed on the cube to obtain the hypergraph. The gain operation includes at least one of a flip on the length axis, a flip on the width axis, a flip on the time axis, and a rotation on a plane of the length axis and the width axis. A rotation angle can be 90 degrees. That is, the hypergraph can be preprocessed before it is input into a model. In one example, a horizontal axis of the 3D coordinate system is the length axis, a longitudinal axis thereof is the width axis, and the vertical axis thereof is the time axis. The flip of the cube (hypergraph) on the length axis is represented by a horizontal flip of the hypergraph, and the flip of the hypergraph on the width axis is represented by a vertical flip of the hypergraph.

In S102, a hypergraph vector of the hypergraph is input into a residual convolutional neural network to obtain an output result of the residual convolutional neural network.

In one example, the preprocessed hypergraph can be represented by the hypergraph vector. The hypergraph vector includes length dimension information, width dimension information, and time domain dimension information. The length dimension information of the hypergraph vector may be the length of the hypergraph in the 3D coordinate system, the width dimension information of the hypergraph vector may be the width of the hypergraph in the 3D coordinate system, and the time domain dimension information of the hypergraph vector may be characterized by using channel dimension information.

In the hypergraph, each frame has a red (R) channel, a green (G) channel, and a blue (B) channel, that is, three channels with RGB. In an embodiment, the channels of each frame in the hypergraph may be arranged in a chronological order, and the arranged channel sequence is used as the channel dimension information of the hypergraph vector in order to represent the time domain dimension information of the hypergraph vector.

For example, the hypergraph consists of T frames. The three channels of each of the T frames can be sequentially arranged in a chronological order to obtain a channel sequence composed of 3T channels. The time domain information in the original video can be represented by the channel dimension information. It should be noted that, during the arrangement, the channels in each frame are arranged in the same order, such as in the order of the R channel, the G channel, and the B channel.

Further, the hypergraph vector having the length dimension information, the width dimension information (spatial information), and the channel dimension information (time domain information) is input to the residual convolutional neural network. Convolution operations and residual learning for the hypergraph vector is performed by the residual convolutional neural network. In the convolution operation, the RGB pixels belonging to different times in the channel dimension participate in the convolution operation at the same time, so that the time domain information can be utilized maximally, thereby improving effect of a super-resolution.

In one embodiment, the residual convolutional neural network may include a multi-layer residual convolution module, such as an i-th layer, where i is a positive integer and may be preset. The S102 may include: inputting an i−1-th input vector into an i-th layer of the residual convolution module to obtain an i-th output vector; splicing the channel dimension information of the i-th output vector and the channel dimension information of the i−1-th input vector, and obtaining an i-th input vector by combining the spliced channel dimension information with length dimension information and width dimension information of the i-th output vector, wherein, i is an integer greater than 2; when i is equal to 1, the i−1-th input vector is the hypergraph vector; and when i is equal to a preset value, the i-th input vector is used as the output result of the residual convolutional neural network.

Each output vector and each input vector include the length dimension information, the width dimension information, and the channel dimension information. In one example, the hypergraph vector is input to a first layer of the residual convolution module to obtain a first output vector; a first input vector is input to a second layer of the residual convolution module to obtain a second output vector, wherein the length dimension information, the width dimension information, and the channel dimension information of the first input vector are the length dimension information of the first output vector, the width dimension information of the first output vector, and the splicing result of the channel dimension information of the first output vector and the hypergraph vector, respectively. The second input vector is input into a third layer of the residual convolution module to obtain a third output vector. The length dimension information, the width dimension information, and the channel dimension information of the second input vector are respectively the length dimension information of the second output vector, the width dimension information of the second output vector, and the splicing result of the channel dimension information of the second output vector and the first input vector. Then, this method can be performed, until i is equal to a preset value, to obtain the output result of the residual convolutional neural network.

In S103, the output result of the residual convolutional neural network is input into a spatial upsampling network to obtain a super-resolution frame, wherein a super-resolution video of the original video is formed by multiple super-resolution frames.

The spatial upsampling network can receive an input with a specific length and width, and respectively magnify the length and width thereof by a set multiple, and use the spatial information and time domain information of each pixel of the output result to generate the super-resolution frame. The input of the spatial upsampling network is the output of the residual convolutional neural network. Since the output of the residual convolutional neural network includes time domain information in the hypergraph, and the time domain information is modeled by the residual convolution network, the method of the embodiment of the present application can be applied in the spatial dimension and the time dimension to perform the super-resolution video reconstruction.

Figure 2:
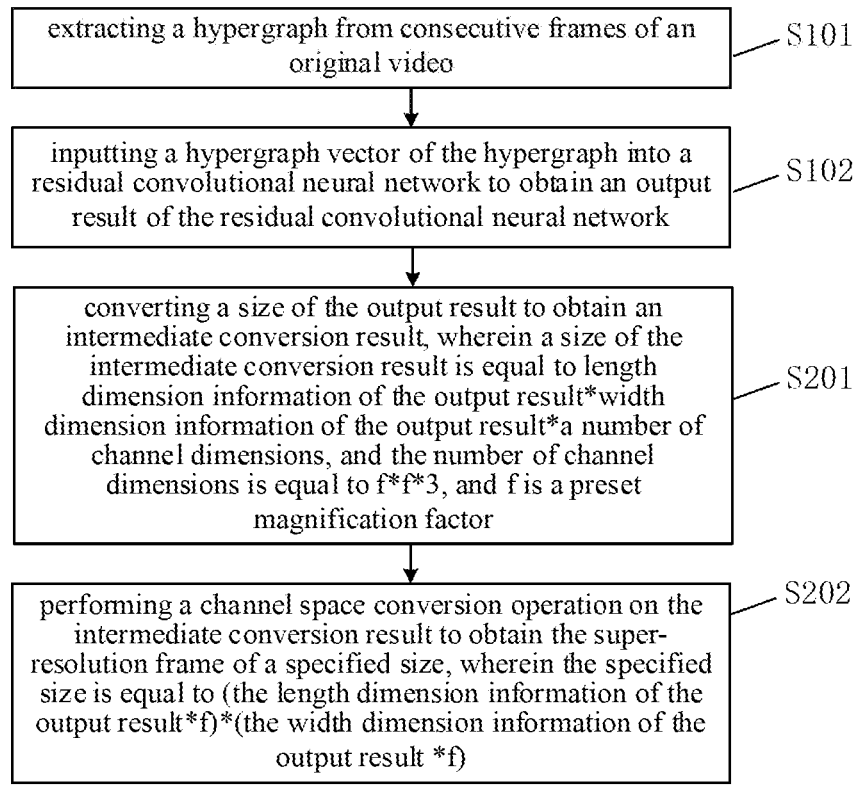
FIG. 2 shows a flowchart of a super-resolution video reconstruction method according to an embodiment of the present application.

In an embodiment, as shown in FIG. 2, the S103 may include S201 to S202:

S201: converting a size of the output result to obtain an intermediate conversion result, wherein a size of the intermediate conversion result is equal to a length dimension information of the output result*width dimension information of the output result*a number of channel dimensions, and the number of channel dimensions is equal to f*f*3, and f is a preset magnification factor;

S202: performing a channel space conversion operation on the intermediate conversion result to obtain the super-resolution frame of a specified size, wherein the specified size is equal to (the length dimension information of the output result*f)*(the width dimension information of the output result*f).

In one example, the length dimension information of the output result of the residual convolutional neural network is 10, the width dimension information thereof is 10, and the channel dimension information thereof is C. The input of the spatial upsampling network is a tensor with 10*10*C. Firstly, the spatial upsampling network converts the input size to 10*10*(f*f*3), that is, (f*f) sub-pixels is generated from each RGB pixel of the output result of the residual convolutional neural network. Then, through a channel space conversion operation, the frame with the specified size of (10*f)*(10*f) is generated.

Figure 3:
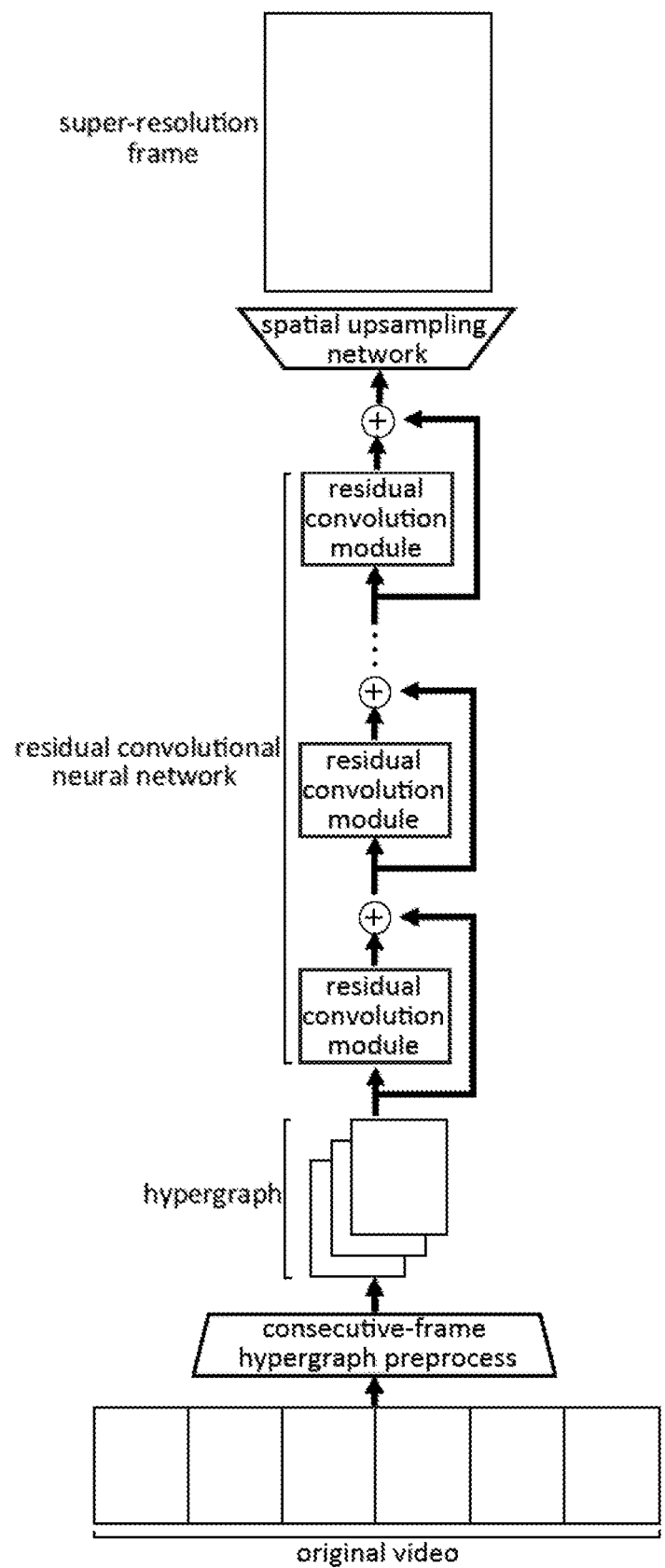
FIG. 3 shows a process schematic diagram of a super-resolution video reconstruction method in one example according to an embodiment of the present application.

In the above method according to an embodiment of the present application, consecutive frames in each clip of the original video may be converted into a super-resolution frame, and further obtaining a super-resolution video of the original video. FIG. 3 shows a process schematic diagram of a super-resolution example according to an embodiment of the present application. As shown in FIG. 3, in this example, a consecutive-frame hypergraph is extracted from the original video, and the preprocessed consecutive-frame hypergraph is input into a model composed of the residual convolutional neural network and the spatial upsampling network to obtain the super-resolution video.

In the embodiment of the present application, the time domain information in the video is preserved by the hypergraph composed of consecutive frames, and the time domain information in the hypergraph is deeply modeled by using the residual convolutional neural network and the spatial upsampling network to improve the effect of the super-resolution. A traditional deconvolution operation is abandoned, since the model can be set up by using the spatial upsampling network, so that artificial shortcoming can be avoided, and the time domain and spatial information in the input tensor can be more directly modeled, thereby improving the effect of super-resolution video reconstruction. Compared with the existing super-resolution video reconstruction method, by using the super-resolution video reconstruction method of the embodiment of the present application, computational complexity can be greatly reduced, which is consistent with the computational complexity of the super-resolution image reconstruction method; since the method herein does not rely on optical flow and motion compensation, additional errors can be avoided and the super-resolution visual effects can be significantly increased.

Figure 4:
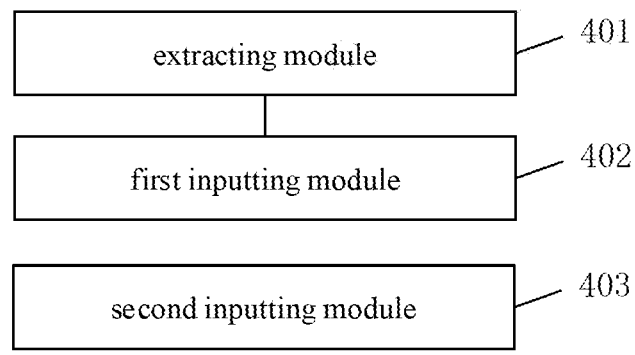
FIG. 4 shows a structural block diagram of a super-resolution video reconstruction device according to embodiments of the present application.

FIG. 4 shows a structural block diagram of a super-resolution video reconstruction device according to embodiments of the present application. The device includes:

an extracting module 401, configured to extract a hypergraph from consecutive frames of an original video;

a first inputting module 402, configured to input a hypergraph vector of the hypergraph into a residual convolutional neural network to obtain an output result of the residual convolutional neural network; and a second inputting module 403, configured to input the output result of the residual convolutional neural network into a spatial upsampling network to obtain a super-resolution frame, wherein a super-resolution video of the original video is formed by multiple super-resolution frames.

Figure 5:
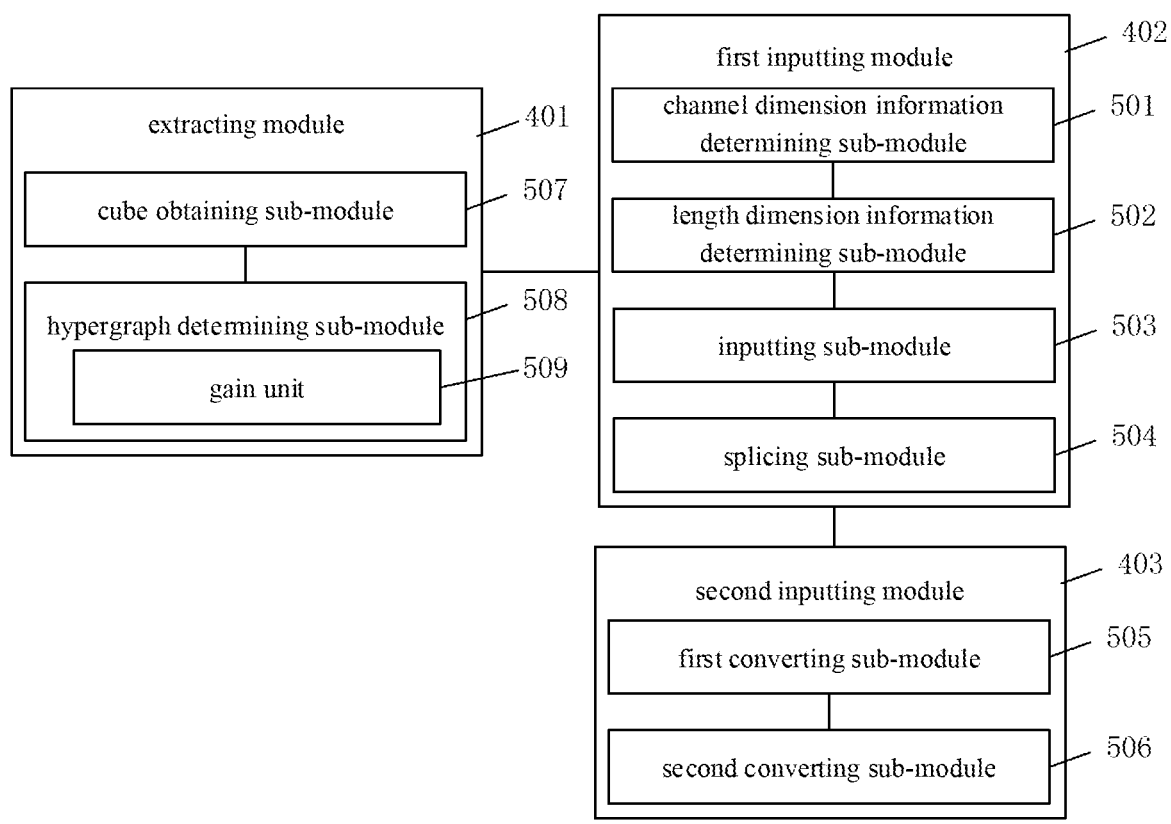
FIG. 5 shows a structural block diagram of a super-resolution video reconstruction device according to an embodiment of the present application.

In an embodiment, as shown in FIG. 5, the first inputting module 402 includes:

a channel dimension information determining sub-module 501, configured to arrange channels of the frames of the hypergraph in a chronological order to obtain an arranged channel sequence, and using the arranged channel sequence as channel dimension information of the hypergraph vector, wherein the channels of each frame includes a red channel, a green channel, and a blue channel; and a length dimension information determining sub-module 502, configured to use a length and a width of the hypergraph respectively as length dimension information and width dimension information of the hypergraph vector, respectively.

In an embodiment, the residual convolutional neural network includes a multi-layer residual convolution module, as shown in FIG. 5, and the first inputting module 402 further includes:

an inputting sub-module 503, configured to input an i−1-th input vector into an i-th layer of the residual residual convolution module to obtain an i-th output vector;

an splicing sub-module 504, configured to splice channel dimension information of the i-th output vector and channel dimension information of the i−1-th input vector, and obtaining an i-th input vector by combining the spliced channel dimension information with length dimension information and width dimension information of the i-th output vector, wherein i is an integer greater than 2; when i is equal to 1, the i−1-th input vector is the hypergraph vector; and when i is equal to a preset value, the i-th input vector is used as the output result of the residual convolutional neural network.

In an embodiment, as shown in FIG. 5, the second inputting module 403 includes:

a first converting sub-module 505, configured to convert a size of the output result to obtain an intermediate conversion result, wherein a size of the intermediate conversion result is equal to length dimension information of the output result*width dimension information of the output result*a number of channel dimensions, and the number of channel dimensions is equal to f*f*3, and f is a preset magnification factor; and a second converting sub-module 506, configured to perform a channel space conversion operation on the intermediate conversion result to obtain the super-resolution frame of a specified size, wherein the specified size is equal to (the length dimension information of the output result*f)*(the width dimension information of the output result*f).

In an embodiment, as shown in FIG. 5, the extracting module 101 includes:

a cube obtaining sub-module 507, configured to cut each frame of the consecutive frames in a time axis direction by using a preset rectangular box in a 3D coordinate system, to obtain the hypergraph represented as a cube, wherein the 3D coordinate system includes a length axis, a width axis, and the time axis; and a hypergraph determining sub-module 508, configured to use the cube as the hypergraph.

In an embodiment, as shown in FIG. 5, the hypergraph determining sub-module 508 includes:

a gain unit 509, configured to perform a gain operation on the cube to obtain the hypergraph, wherein the gain operation includes at least one of a flip on the length axis, a flip on the width axis, a flip on the time axis, and a rotation on a plane of the length axis and the width axis.

In this embodiment, functions of modules in the device refer to the corresponding description of the above mentioned method and thus the description thereof is omitted herein.

Figure 6:
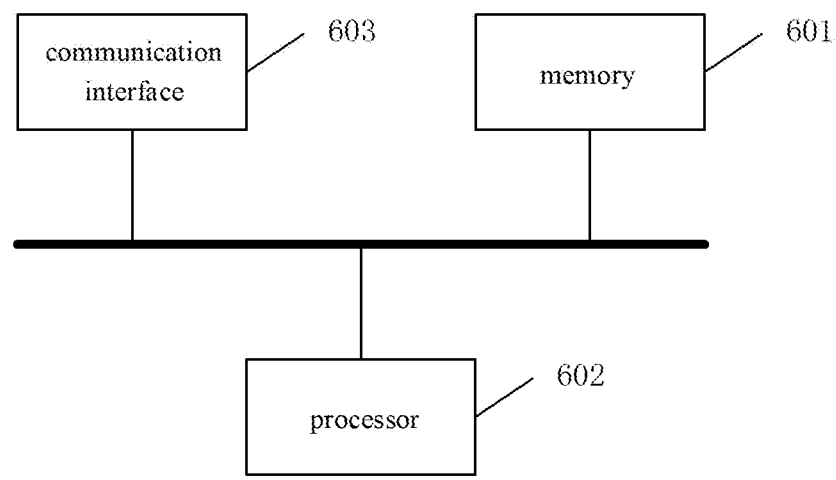
FIG. 6 shows a structural block diagram of a super-resolution video reconstruction apparatus according to an embodiment of the present application.

FIG. 6 shows a structural block diagram of a super-resolution video reconstruction apparatus according to an embodiment of the application. As shown in FIG. 6, the apparatus includes: a memory 601 and a processor 602. A computer executable on the processor 602 is stored in the memory 601. When the processor 602 executes the computer program, the super-resolution video reconstruction method in the foregoing embodiment is implemented. The number of the memory 601 and the processor 602 may be one or more.

The apparatus further includes:

a communication interface 603 configured to communicate with an external device and exchange data.

The memory 601 may include a high-speed RAM memory and may also include a non-volatile memory, such as at least one magnetic disk memory.

If the memory 601, the processor 602, and the communication interface 603 are implemented independently, the memory 601, the processor 602, and the communication interface 603 may be connected to each other through a bus and communicate with one another. The bus may be an Industry Standard Architecture (ISA) bus, a Peripheral Component Interconnect (PCI) bus, an Extended Industry Standard Component (EISA) bus, or the like. The bus may be divided into an address bus, a data bus, a control bus, and the like. For ease of illustration, only one bold line is shown in FIG. 6, but it does not mean that there is only one bus or one type of bus.

Optionally, in a specific implementation, if the memory 601, the processor 602, and the communication interface 603 are integrated on one chip, the memory 601, the processor 602, and the communication interface 603 may implement mutual communication through an internal interface.

According to an embodiment of the present application, a computer-readable storage medium is provided for storing a program, which is executed by a processor, to implement the super-resolution video reconstruction method in the above embodiments.

In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the present application. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present application, "a plurality of" means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" may be any device that may contain, store, communicate, propagate, or transport the program for use by or in connection with the instruction execution system, device, or apparatus. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium may even be paper or other suitable medium upon which the program may be printed, as it may be read, for example, by optical scanning of the paper or other medium, followed by editing, interpretation or, where appropriate, process otherwise to electronically obtain the program, which is then stored in a computer memory.

It should be understood that various portions of the present application may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the present application may be integrated in one processing module, or each of the units may exist alone physically, or two or more units may be integrated in one module. The above-mentioned integrated module may be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

What is claimed is:

1. A super-resolution video reconstruction method, comprising:
    extracting a hypergraph from consecutive frames of an original video;
    inputting a hypergraph vector of the hypergraph into a residual convolutional neural network to obtain an output result of the residual convolutional neural network; and
    inputting the output result of the residual convolutional neural network into a spatial upsampling network to obtain a super-resolution frame, wherein a super-resolution video of the original video is formed by multiple super-resolution frames.

2. The super-resolution video reconstruction method according to claim 1, wherein the inputting a hypergraph vector of the hypergraph into a residual convolutional neural network to obtain an output result of the residual convolutional neural network comprises:
    arranging channels of the frames of the hypergraph in a chronological order to obtain an arranged channel sequence, and using the arranged channel sequence as channel dimension information of the hypergraph vector, wherein the channels of each frame include a red channel, a green channel, and a blue channel; and
    using a length and a width of the hypergraph as length dimension information and width dimension information of the hypergraph vector, respectively.

3. The super-resolution video reconstruction method according to claim 2, wherein the residual convolutional neural network comprises a multi-layer residual convolution module, and the inputting a hypergraph vector of the hypergraph into a residual convolutional neural network to obtain an output result of the residual convolutional neural network further comprises:
    inputting an i−1-th input vector into an i-th layer of the residual convolution module to obtain an i-th output vector;
    splicing channel dimension information of the i-th output vector and channel dimension information of the i−1-th input vector, and obtaining an i-th input vector by combining the spliced channel dimension information with length dimension information and width dimension information of the i-th output vector,
    wherein i is an integer greater than 2; when i is equal to 1, the i−1-th input vector is the hypergraph vector; and when i is equal to a preset value, the i-th input vector is used as the output result of the residual convolutional neural network.

4. The super-resolution video reconstruction method according to claim 1, wherein the inputting the output result of the residual convolutional neural network into a spatial upsampling network to obtain a super-resolution frame comprises:
    converting a size of the output result to obtain an intermediate conversion result, wherein a size of the intermediate conversion result is equal to length dimension information of the output result*width dimension information of the output result*a number of channel dimensions, and the number of channel dimensions is equal to f*f*3, and f is a preset magnification factor; and
    performing a channel space conversion operation on the intermediate conversion result to obtain the super-resolution frame of a specified size, wherein the specified size is equal to (the length dimension information of the output result*f)*(the width dimension information of the output result*f).

5. The super-resolution video reconstruction method according to claim 1, wherein the extracting a hypergraph from consecutive frames of an original video comprises:
    cutting each frame of the consecutive frames in a time axis direction by using a preset rectangular box in a 3D coordinate system, to obtain the hypergraph represented as a cube, wherein the 3D coordinate system comprises a length axis, a width axis, and the time axis; and
    using the cube as the hypergraph.

6. The super-resolution video reconstruction method according to claim 5, wherein the using the cube as the hypergraph comprises:
    performing a gain operation on the cube to obtain the hypergraph, wherein the gain operation comprises at least one of a flip on the length axis, a flip on the width axis, a flip on the time axis, and a rotation on a plane of the length axis and the width axis.

7. A super-resolution video reconstruction apparatus, comprising:
    one or more processors; and
    a storage device configured to store one or more programs, wherein
    the one or more programs, when executed by the one or more processors, cause the one or more processors to:
        extract a hypergraph from consecutive frames of an original video;
        input a hypergraph vector of the hypergraph into a residual convolutional neural network to obtain an output result of the residual convolutional neural network; and
        input the output result of the residual convolutional neural network into a spatial upsampling network to obtain a super-resolution frame, wherein a super-resolution video of the original video is formed by multiple super-resolution frames.

8. The super-resolution video reconstruction apparatus according to claim 7, wherein the one or more programs, when executed by the one or more processors, cause the one or more processors further to:
    arrange channels of the frames of the hypergraph in a chronological order to obtain an arranged channel sequence, and using the arranged channel sequence as channel dimension information of the hypergraph vector, wherein the channels of each frame includes a red channel, a green channel, and a blue channel; and use a length and a width of the hypergraph as length dimension information and width dimension information of the hypergraph vector, respectively.

9. The super-resolution video reconstruction apparatus according to claim 8, wherein the residual convolutional neural network comprises a multi-layer residual convolution module, and wherein the one or more programs, when executed by the one or more processors, cause the one or more processors further to:

input an i−1-th input vector into an i-th layer of the residual residual convolution module to obtain an i-th output vector;

splice channel dimension information of the i-th output vector and channel dimension information of the i−1-th input vector, and obtaining an i-th input vector by combining the spliced channel dimension information with length dimension information and width dimension information of the i-th output vector, wherein i is an integer greater than 2; when i is equal to 1, the i−1-th input vector is the hypergraph vector; and when i is equal to a preset value, the i-th input vector is used as the output result of the residual convolutional neural network.

10. The super-resolution video reconstruction apparatus according to claim 7, wherein the one or more programs, when executed by the one or more processors, cause the one or more processors further to:

convert a size of the output result to obtain an intermediate conversion result, wherein a size of the intermediate conversion result is equal to length dimension information of the output result*width dimension information of the output result*a number of channel dimensions, and the number of channel dimensions is equal to f*f*3, and f is a preset magnification factor; and perform a channel space conversion operation on the intermediate conversion result to obtain the super-resolution frame of a specified size, wherein the specified size is equal to (the length dimension information of the output result*f)*(the width dimension information of the output result*f).

11. The super-resolution video reconstruction apparatus according to claim 7, wherein the one or more programs, when executed by the one or more processors, cause the one or more processors further to:

cut each frame of the consecutive frames in a time axis direction by using a preset rectangular box in a 3D coordinate system, to obtain the hypergraph represented as a cube, wherein the 3D coordinate system comprises a length axis, a width axis, and the time axis; and use the cube as the hypergraph.

12. The super-resolution video reconstruction apparatus according to claim 11, wherein the one or more programs, when executed by the one or more processors, cause the one or more processors further to:

perform a gain operation on the cube to obtain the hypergraph, wherein the gain operation comprises at least one of a flip on the length axis, a flip on the width axis, a flip on the time axis, and a rotation on a plane of the length axis and the width axis.

13. A non-transitory computer-readable storage medium comprising computer executable instructions stored thereon, wherein the executable instructions, when executed by a processor, causes the processor to implement the super-resolution video reconstruction method of claim 1.

* * * * *